United States Patent [19]

Guenther et al.

[11] Patent Number: 4,863,599
[45] Date of Patent: Sep. 5, 1989

[54] FILTER ARRANGEMENT

[75] Inventors: Michael Guenther, Liachingen; Ernst-Wilhelm Hufendiek, Stuttgart, both of Fed. Rep. of Germany

[73] Assignee: Daimler-Benz Aktiengesellschaft, Stuttgart, Fed. Rep. of Germany

[21] Appl. No.: 69,487

[22] Filed: Jul. 2, 1987

[30] Foreign Application Priority Data

Jul. 2, 1986 [DE] Fed. Rep. of Germany ....... 3622154

[51] Int. Cl.⁴ .............................................. B01D 27/04
[52] U.S. Cl. .................................. 210/248; 210/440; 210/437; 210/443
[58] Field of Search ...................... 210/168, 407, 416.5, 210/464, DIG. 13, DIG. 17, 239, 248, 438, 440; 123/196 A

[56] References Cited

U.S. PATENT DOCUMENTS

| | | | |
|---|---|---|---|
| 2,253,686 | 8/1941 | Burckhalter | 210/DIG. 13 |
| 2,406,308 | 8/1946 | Vokes et al. | 210/DIG. 13 |
| 2,422,647 | 6/1947 | Vokes | 210/DIG. 13 |
| 2,750,042 | 6/1956 | Wilkinson | 210/DIG. 13 |

FOREIGN PATENT DOCUMENTS

| | | |
|---|---|---|
| 3432855 | 6/1974 | Fed. Rep. of Germany . |
| 2555420A2 | 4/1977 | Fed. Rep. of Germany . |
| 8205929 | 2/1984 | Fed. Rep. of Germany . |
| 3344568A1 | 6/1985 | Fed. Rep. of Germany . |
| 3416304 | 11/1985 | Fed. Rep. of Germany . |
| 2295230 | 10/1970 | France . |
| 2294734 | 1/1983 | France . |
| 2566045 | 10/1983 | France . |
| 751892 | 7/1956 | United Kingdom ....... 210/DIG. 13 |

Primary Examiner—W. Gary Jones
Assistant Examiner—Matthew Savage

[57] ABSTRACT

A filter arrangement having an upright filter with a filter housing and a filter insert for cleaning lubricating oil of an internal combustion engine, in which the filter is fastened at a filter socket located in the lower part in the installed position of the filter; a first channel for feeding dirty oil, a second channel for discharging clean oil and a third channel for discharging oil from the interior of the filter are provided in the filter socket as well as a passage from the interior of the filter housing to the third channel which is necessarily opened during a change of the filter insert. In order to achieve a clear separation of the clean oil from the oil flowing off out of the filter during a change of the filter, the passage is arranged in a collar of the filter socket closely surrounding the lower part of the filter housing and is covered off by the filter housing in the installed position thereof.

4 Claims, 1 Drawing Sheet

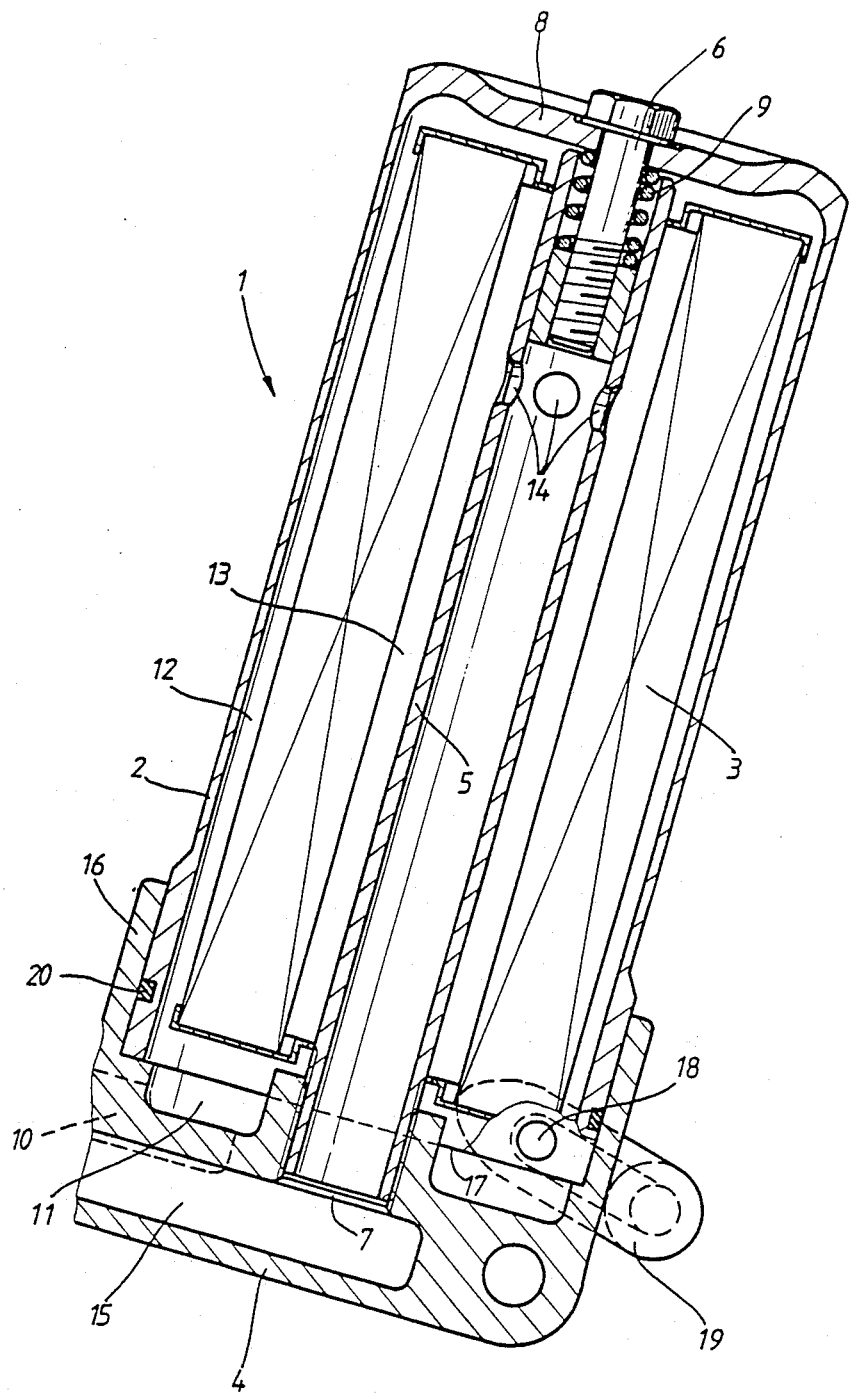

ized filter arrangement with an upright filter having a filter housing and filter insert for cleaning lubricating oil of an internal combustion engine in which the filter is fastened at a filter socket located in the lower part in the installed condition of the filter arrangement, and in which a first channel is provided in the socket for the feed of lubricating oil, a second channel is provided for the discharge of clean oil and a third channel is provided for the discharge of oil out of the interior of the filter, and in which a passage is forcibly opened during the change of the filter insert which leads from the inside of the filter housing to the third channel.

Such a filter arrangement is disclosed in the DE-PS No. 25 55 420. The disadvantage exists with this prior art filter arrangement that during a filter change, dirty oil reaches the clean oil channel. Additionally, this prior art filter arrangement is structurally very high by reason of the necessity to arrange the individual channels in the filter socket one above the other.

The present invention is concerned with the task to so construct the filter arrangement of the aforementioned type that during the filter change a necessary emptying of the interior of the filter is attained in a simple manner without mixing clean oil with dirty oil and accompanied with a low structural height of the entire filter arrangement.

The underlying problems are solved according to the present invention in that the passage is arranged in a collar of the filter socket narrowly surrounding the lower part of the filter housing and is sealingly covered off by the filter housing in the installed position thereof.

In the filter arrangement according to the present invention, the passage is necessarily controlled by the filter housing into its open position when the filter is lifted up so that the oil can flow out of the filter interior into the third channel and through the latter into an oil reservoir such as the oil pan of the internal combustion engine. This third channel is laid out completely independent of the two other oil-conducting channels so that a mixing of clean oil and dirty oil is precluded. Additionally, it is arranged approximately at the height of the lower area of the filter housing and not below the two other channels so that the entire structural height of the filter arrangement according to the present invention is reduced compared to the prior art type of filter arrangement. The present invention is utilizable both with a separate construction of the filter insert and filter housing as also with a construction of filter insert and filter housing in a structural unit as so-called throw-away cartridge.

A filter arrangement is additionally disclosed in the DE-OS No. 33 44 568 in which the mixing of clean oil and dirty oil is avoided when changing the filter. However, the arrangement of a special valve is necessary for that purpose; additionally, the arrangement of the channels one above the other results in a considerable structural height.

According to another feature of the present invention, the construction of the filter arrangement assures already during the loosening of the filter the opening of the passage and therewith the emptying of the filter housing without the need for the person carrying out the filter change operation to pay particular attention thereto. This is achieved by a prestressed spring engaging at the filter housing or at the filter insert which during loosening the fastening of the filter lifts the same from the filter socket up to the full opening of the passage.

According to still another feature of the present invention, the filter arrangement assures the sealing of the interior of the filter with respect to the outside by a single seal, and more particularly both during the operation as also during the emptying of the filter interior. This is achieved in that an annular seal is arranged between the filter housing and the collar above the passage which remains effective during the lifting of the filter housing up to the full opening of the passage.

BRIEF DESCRIPTION OF THE DRAWING

These and other objects, features and advantages of the present invention will become more apparent from the following description when taken in connection with the accompanying drawing which shows, for purposes of illustration only, one embodiment in accordance with the present invention, and wherein:

The single FIGURE is a cross-sectional view through a filter arrangement in accordance with the present invention.

DETAILED DESCRIPTION OF THE DRAWING

Referring now to the single figure of the drawing, the filter arrangement according to the preset invention essentially consists of a filter generally designated by reference numeral 1 having a filter housing 2 and a filter insert 3 as well as a filter socket 4 on which the filter is secured standing up in an inclined position with the aid of a tubular member 5 and of a bolt 6. The tubular member 5 is adhesively secured in or screwed into an opening 7 provided in the filter socket 4 and extends through the filter 1 centrally up to within the area of the cover 8 of the filter housing 2. The tubular member 5 is screwed together thereat with the bolt 6 seated on the cover 8 which presses the filter housing 2 securely against the filter socket 4. A spring 9 which surrounds the shank of the bolt 6 and is prestressed in the installed position is inserted between the tubular member 5 and the cover 8; during disengagement of the bolt 6, the spring 9 lifts up the filter housing 2 by a predetermined amount by support at the tubular member 5 up to the unstressing thereof.

The dirty oil reaches an annular channel 11 by way of a first channel 10 provided in the filter socket 4, from there a dirty oil space 12 in the filter 1 and is cleaned during the subsequent passage through the filter insert 3. The clean oil collects in the clean oil space 13 surrounding the tubular member 5, enters into the same through openings 14 provided in the upper area of the tubular member 5 and then flows off through a second channel 15 in the filter socket 4 which adjoins the opening 7.

The lower part of the filter housing 2 is inserted with a slightly increased wall thickness into a circumferential collar 16 of the filter socket 4 which forms a sort of tub. A passage 18 is provided in the collar 16 in the lowest area of the tub directly above the lower edge 17 of the filter housing 2 in the installed position thereof, which passage is in communication with a third channel 19 in the filter socket 4 that leads to the oil reservoir of the associated internal combustion engine. The passage 18 is thus covered off by the filter housing 2 in the installed position thereof, i.e., during the normal operation. Notwithstanding the exclusively metallic seal, at most a small quantity of oil can reach the passage 18 from the annular channel 11 because a relatively good seal is obtained as a result of the lower edge 17 pressed against the filter socket 4 and of the narrow gap between the collar 16 and the filter housing 2. The oil quantity which reaches the passage 18 during the operation does not represent any loss because it is again conducted back to the oil circulation by way of the channel 19 and the oil reservoir. The seal of the annular channel 11 and of the dirty oil space 12 with respect to the outside takes place by an annular seal in the outer circumference of the filter housing 2 at the height of the collar 16 directly above the passage 18 so that the latter is also sealed off with respect to the outside by the annular seal 20 and therefore does not require any separate seal.

At the beginning of the filter change, the bolt 6 is loosened so that the prestressed spring 9 up to its unstressing lifts up the filter housing 2 so far that the lower edge 17 of the filter housing 2 comes to lie directly above the passage 18 and therewith effectively controls the same to be opened therewith. All of the oil present in the interior of the filter housing 2 can flow off by way of the passage 18 and the channel 19 into the oil reservoir. The clean oil present inside of the tubular member 5 either flows off by way of the channel 15 or remains within the same; however, it cannot reach the outside and thus represent an environmental problem. The collar 16 has such a height that the annular seal 20 abuts at the collar 16 also in this emptying position of the filter 1 whereby a seal with respect to the outside is assured also during the emptying of the filter 1.

If all of the old oil has drained out of the filter 1, the latter is removed completely out of the filter socket 4 and either the entire filter 1 or only the filter insert 3 is replaced by a new one.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A filter arrangement, including a liftable filter housing means for enclosing a filter insert means for cleaning lubricating oil of an internal combustion engine; filter socket means, located in the lower part of the filter arrangement an installed position of the liftable filter housing means; fastening means for fastening the liftable filter housing means at the filter socket means; said filter socket means being provided with a first channel means for feeding lubricating oil to the filter insert means; a second channel means for discharging clean oil from the filter insert means; a third channel means for discharging oil from the inside of the liftable filter housing means by way of a passage means from the interior of the liftable filter housing means to the third channel means, which is arranged in a collar means of the filter socket means closely surrounding a lower part of the liftable filter housing means; and said passage means being sealingly closed off by the liftable filter housing means in its installed position and opened by lifting of the liftable filter housing means.

2. A filter arrangement according to claim 1, further comprising prestressed spring means located between the first filter socket means and the liftable filter housing means, which during loosening of the fastening means, the prestressed spring means lifts the liftable filter housing means from the filter socket means opening the passage means in said collar means.

3. A filter arrangement according to claim 2, further comprising an annular seal means for providing a seal between the liftable filter housing means and the collar means above the passage means even during lifting of the liftable filter housing means to the full opening of the passage means.

4. A filter arrangement according to claim 1, further comprising an annular seal means for providing a seal between the liftable filter housing means and the collar means above the passage means even during lifting of the liftable filter housing means opening the passage means in said collar means.

* * * * *